(12) United States Patent
Kakutani et al.

(10) Patent No.: US 11,579,813 B2
(45) Date of Patent: Feb. 14, 2023

(54) IMAGE FORMING APPARATUS THAT MAKES IT EASY TO FIND FILE BEING PRINT TARGET, CONTROL METHOD FOR IMAGE FORMING APPARATUS, AND PRINTING SYSTEM

(71) Applicant: CANON KABUSHIKI KAISHA, Tokyo (JP)

(72) Inventors: Naoya Kakutani, Chiba (JP); Akira Ishikawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/464,433

(22) Filed: Sep. 1, 2021

(65) Prior Publication Data

US 2022/0075569 A1 Mar. 10, 2022

(30) Foreign Application Priority Data

Sep. 8, 2020 (JP) .............................. JP2020-150538

(51) Int. Cl.
*G06F 3/12* (2006.01)
(52) U.S. Cl.
CPC .......... *G06F 3/1204* (2013.01); *G06F 3/1253* (2013.01); *G06F 3/1286* (2013.01)
(58) Field of Classification Search
CPC ..... G06F 3/1204; G06F 3/1253; G06F 3/1286
USPC ....................................................... 358/1.15
See application file for complete search history.

(56) References Cited

U.S. PATENT DOCUMENTS

| 8,531,691 | B2 * | 9/2013 | Ohara | G06F 3/1247 |
| | | | | 358/1.9 |
| 2012/0019859 | A1 * | 1/2012 | Natori | G06F 3/1288 |
| | | | | 358/1.15 |
| 2012/0206763 | A1 * | 8/2012 | Yoshida | G06F 3/1263 |
| | | | | 358/1.15 |
| 2012/0229851 | A1 * | 9/2012 | Nishida | G06F 3/1267 |
| | | | | 358/1.15 |
| 2015/0205558 | A1 * | 7/2015 | Oike | G06F 3/048 |
| | | | | 358/1.15 |
| 2020/0151526 | A1 * | 5/2020 | Natori | G06K 15/1809 |
| 2021/0026583 | A1 * | 1/2021 | Suzuki | G06K 15/1836 |

FOREIGN PATENT DOCUMENTS

JP 2014-159123 A 9/2014

* cited by examiner

*Primary Examiner* — Allen H Nguyen
(74) *Attorney, Agent, or Firm* — Canon U.S.A., Inc. IP Division

(57) ABSTRACT

Embodiments of the disclosure provide an image forming apparatus configured to print files stored in a plurality of servers. The image forming apparatus comprises a retaining unit configured to retain files transmitted according to an instruction issued by a user, a display control unit configured to control a display of a print instruction screen that includes a first list generated based on a storage file list showing files, which are files stored in any one of the plurality of servers and correspond to user authentication information inputted when logging into the image forming apparatus, and a second list showing the retained files, and a printing unit configured to print files selected by the user on the print instruction screen. The first list is a list obtained by synthesizing a plurality of the storage file lists that are transmitted from the plurality of servers, respectively.

7 Claims, 8 Drawing Sheets

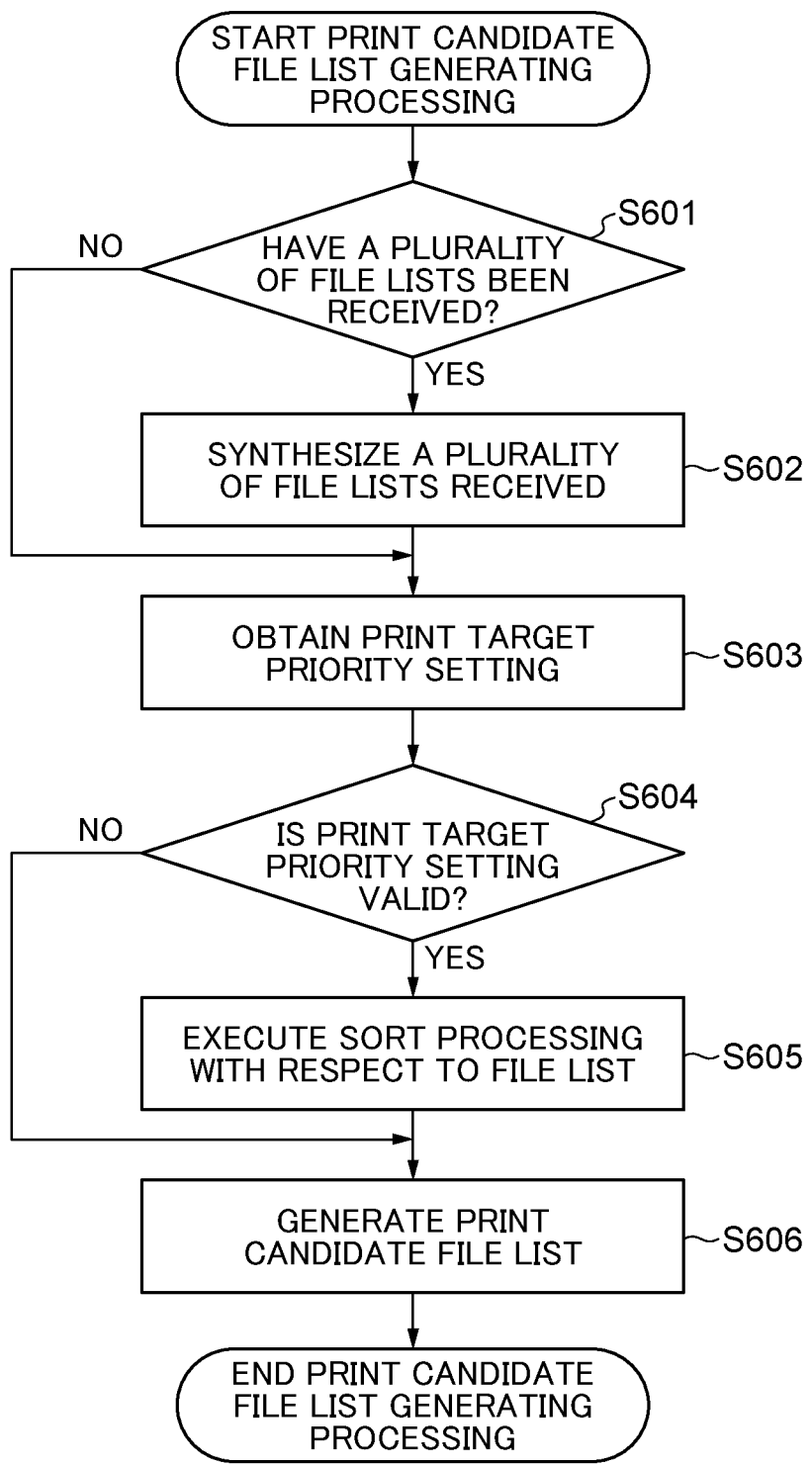

FIG. 8

PRINT DESIGNATION SCREEN —801

RECEIVED PRINT DATA LIST

802

| SELECT | NUMBER | FILE NAME | USER NAME | STATE | SOURCE OF PRINT DATA | DATE AND TIME |
|---|---|---|---|---|---|---|
| ☑ | 0001 | Doc1.doc | User1 | WAITING | 192.168.100.100 | 2020/07/01 / 16:30 |
| ☐ | 0002 | Doc2.doc | User1 | WAITING | 192.168.100.100 | 2020/07/01 / 1:00 |
| ☐ | 0003 | Doc3.doc | User1 | WAITING | 192.168.100.100 | 2020/07/01 / 09:00 |

803

| SELECT | NUMBER | FILE NAME | USER NAME | STATE | SOURCE OF PRINT DATA | DATE AND TIME |
|---|---|---|---|---|---|---|
| ☑ | 0001 | DocA.doc | User1 | WAITING | CLOUD STORAGE A | 2020/07/01 / 16:30 |
| ☑ | 0002 | Sheet.xls | User1 | WAITING | CLOUD STORAGE A | 2020/07/01 / 1:00 |
| ☐ | 0003 | Sheet2.xls | User1 | WAITING | CLOUD STORAGE B | 2020/07/01 / 09:00 |
| ☐ | 0004 | Poster1.ppt | User1 | WAITING | CLOUD STORAGE B | 2020/07/01 / 08:30 |
| ☐ | 0005 | Poster2.ppt | User1 | WAITING | CLOUD STORAGE C | 2020/06/30 / 21:00 |

[TERMINATE]   [PRINT]—804

IMAGE FORMING APPARATUS THAT MAKES IT EASY TO FIND FILE BEING PRINT TARGET, CONTROL METHOD FOR IMAGE FORMING APPARATUS, AND PRINTING SYSTEM

BACKGROUND

Field of the Disclosure

The present disclosure relates to an image forming apparatus that makes it easy to find a file being a print target, a control method for the image forming apparatus, and a printing system.

Description of the Related Art

An image forming apparatus having an operating panel is known. The image forming apparatus executes a print processing according to an instruction inputted into the operating panel by a user (for example, see Japanese Laid-Open Patent Publication (kokai) No. 2014-159123). A file list showing a plurality of files temporarily retained (hereinafter referred to as "reserved") in a storage device of the image forming apparatus and a file list showing a plurality of files stored in a cloud storage capable of communicating with the image forming apparatus are displayed on the operating panel. The user selects the file being the print target from the file lists displayed on the operating panel.

Conventionally, a screen for displaying a file list (hereinafter referred to as "a file list screen") is different for each storage location such as the storage device of the image forming apparatus or the cloud storage. Therefore, it is necessary for the user to switch the screen of the operating panel to the file list screen of the storage location of a desired file, as a result, it will take labor and time.

SUMMARY

Embodiments of the present disclosure provide an image forming apparatus capable of making it easy for a user to find a file being a print target, a control method for the image forming apparatus, and a printing system.

Accordingly, embodiments of the present disclosure provide an image forming apparatus that prints files stored in a plurality of servers, comprising a retaining unit configured to retain files transmitted according to an instruction issued by a user, a display control unit configured to control a display of a print instruction screen that includes a first list generated based on a storage file list showing files, which are files stored in any one of the plurality of servers and correspond to user authentication information inputted when logging into the image forming apparatus, and a second list showing the retained files, and a printing unit configured to print files selected by the user on the print instruction screen, and wherein the first list is a list obtained by synthesizing a plurality of the storage file lists that are transmitted from the plurality of servers, respectively.

According to embodiments of the present disclosure, it is possible for the user to easily find the file being the print target.

Further features of the present disclosure will become apparent from the following description of exemplary embodiments with reference to the attached drawings.

BRIEF DESCRIPTION OF THE DRAWINGS

FIG. 6 is a flowchart that shows procedures of a print candidate file list generating processing of a step S410 of FIG. 4.

FIG. 8 is a diagram that shows an example of a reservation printing function screen displayed on an operating panel of the multifunction peripheral of FIG. 2A.

DESCRIPTION OF THE EMBODIMENTS

Embodiments of the present disclosure will now be described in detail below with reference to the accompanying drawings showing embodiments thereof.

At first, an image forming apparatus according to an embodiment of the present disclosure will be described. Further, in the embodiment, although a case that an embodiment of the present disclosure is applied to a multifunction peripheral (a digital multifunction peripheral/a MFP) as the image forming apparatus will be described, the image forming apparatus in the present disclosure is not limited to the multifunction peripheral. For example, embodiments of the present disclosure may be applied to a printing apparatus such as an SFP (Single Function Peripheral) that performs reservation printing.

Figure 1:
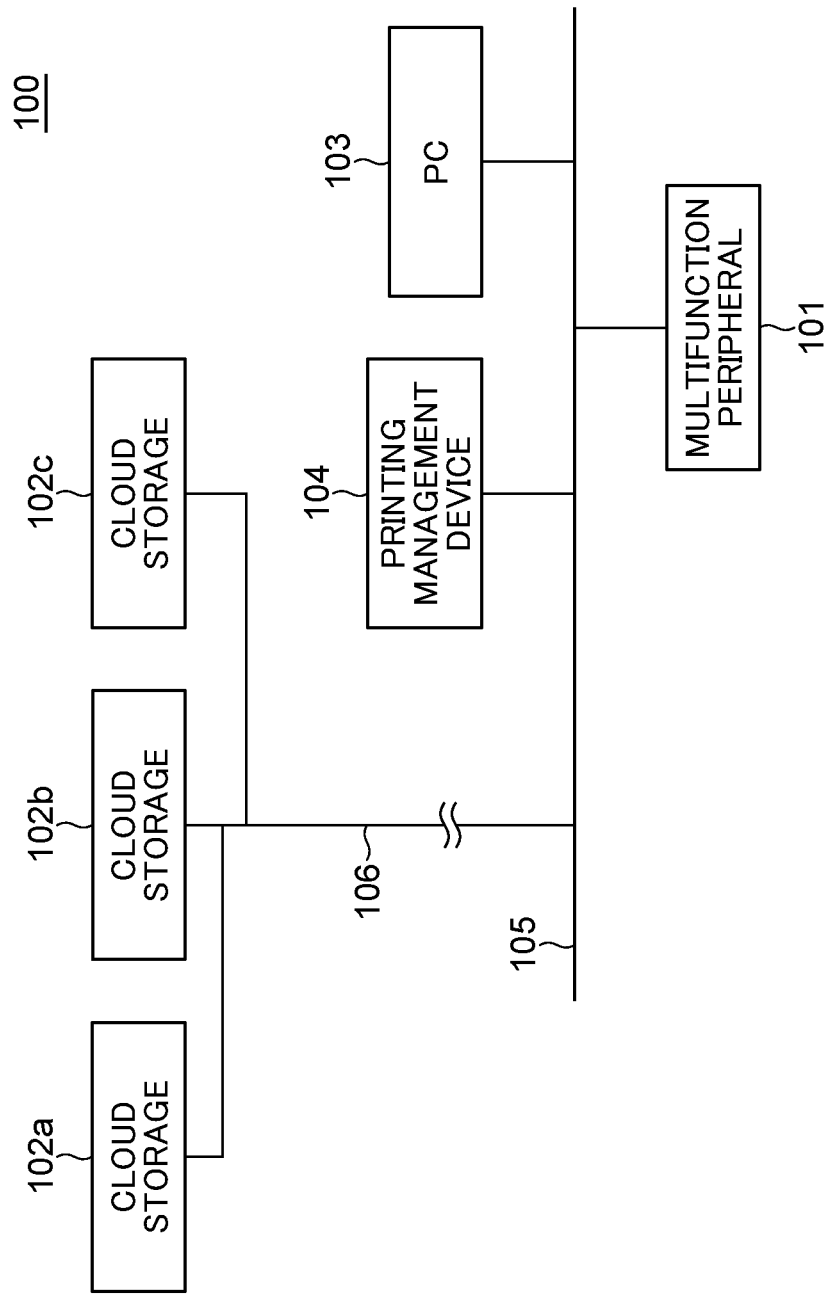
FIG. 1 is a block diagram that schematically shows a configuration of a printing system including a multifunction peripheral as an image forming apparatus according to an embodiment of the present disclosure.

FIG. 1 is a block diagram that schematically shows a configuration of a printing system 100 including a multifunction peripheral 101 as the image forming apparatus according to the embodiment of the present disclosure. As shown in FIG. 1, the printing system 100 has the multifunction peripheral 101, a cloud storage 102a, a cloud storage 102b and a cloud storage 102c that function as a plurality of servers (hereinafter simply referred to as "the cloud storage 102a to the cloud storage 102c"), a PC (personal computer) 103, and a printing management device 104 as an information processing apparatus. Further, in the embodiment, as an example, a configuration that the printing system 100 includes one image forming apparatus, one PC, and one information processing apparatus will be described, but the present disclosure is not limited to this configuration. For example, the printing system 100 may be configured to include a plurality of image forming apparatuses, a plurality of PCs, and a plurality of printing management devices. Furthermore, in the embodiment, as an example, a configuration that the printing system 100 includes three servers will be described, but the present disclosure is not limited to this configuration, and the printing system 100 only need to have at least two servers.

In the printing system 100, the multifunction peripheral 101 can communicate with the PC 103 and the printing management device 104 via a network 105. Further, in the printing system 100, the PC 103 and the printing management device 104 can communicate with the cloud storage 102a to the cloud storage 102c via the network 105 and an external network 106.

The multifunction peripheral 101 has a copy function, a scan function, a communication function, and the like. Further, the multifunction peripheral 101 performs the reservation printing. In the reservation printing, the multifunction peripheral 101 temporarily retains a file received from the printing management device 104 or the like without immediately printing the file, and prints the retained file according to an execution instruction issued by a user who logged into the multifunction peripheral 101.

The cloud storage 102a to the cloud storage 102c store files having extensions such as "pptx", "doc", "pdf", and "zip" that are generated by the user operating the PC 103. The printing management device 104 supports a print processing executed by the multifunction peripheral 101. For example, the printing management device 104 generates a print candidate file list that shows a plurality of files stored in the cloud storage 102a to the cloud storage 102c, which are servers registered in the printing management device 104. The printing management device 104 transmits the generated the print candidate file list to the multifunction peripheral 101.

Figure 2A:
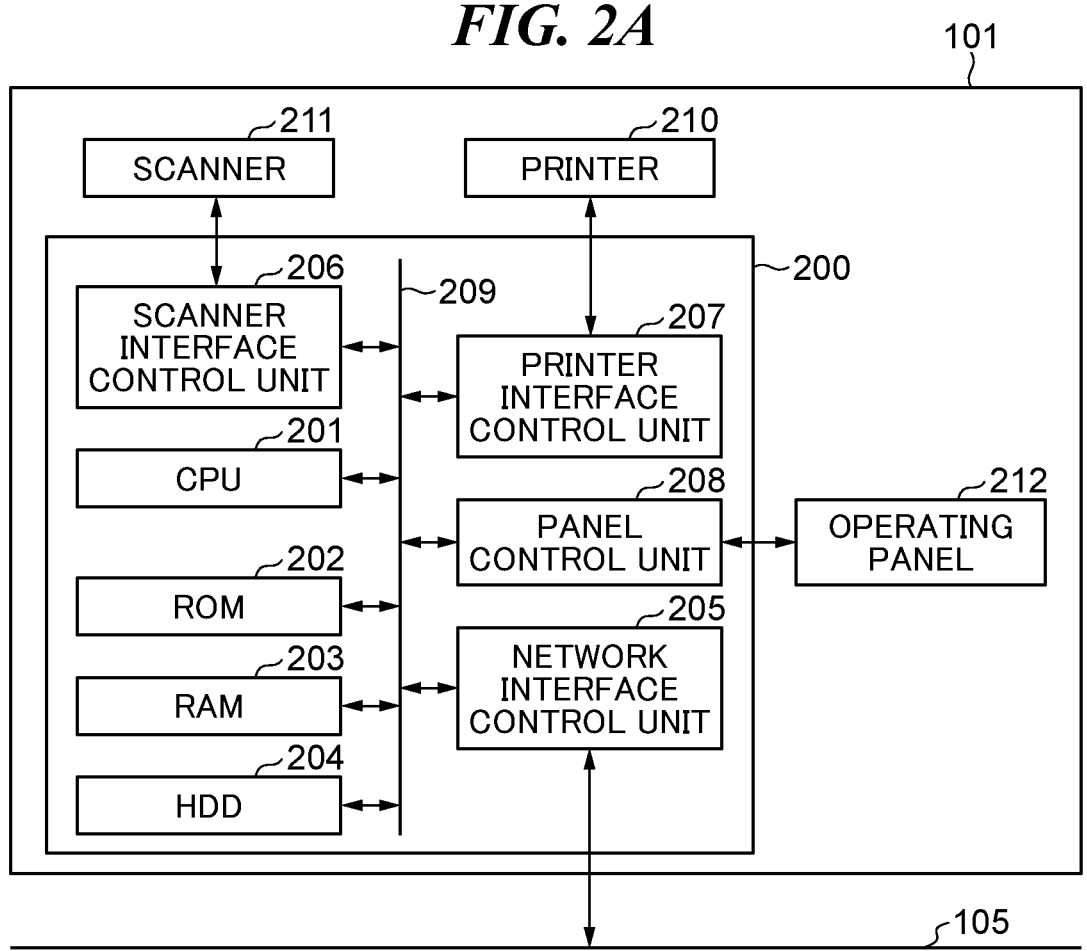
FIG. 2A is a block diagram that schematically shows a hardware configuration of the multifunction peripheral of FIG. 1.
Figure 2B:
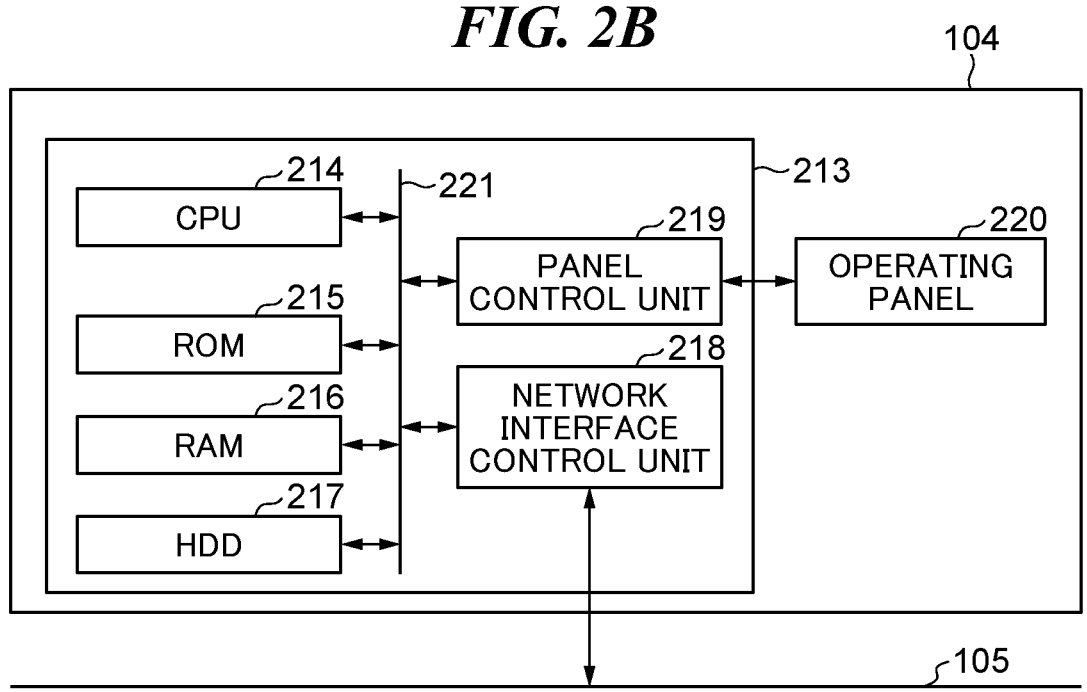
FIG. 2B is a block diagram that schematically shows a hardware configuration of a printing management device of FIG. 1.

FIG. 2A is a block diagram that schematically shows a hardware configuration of the multifunction peripheral 101 of FIG. 1, and FIG. 2B is a block diagram that schematically shows a hardware configuration of the printing management device 104 of FIG. 1. FIG. 2A shows the hardware configuration of the multifunction peripheral 101. As shown in FIG. 2A, the multifunction peripheral 101 has a control unit 200, a printer 210, a scanner 211, and an operating panel 212. The control unit 200 is connected to the printer 210, the scanner 211, and the operating panel 212, respectively. Further, the control unit 200 includes a CPU (Central Processing Unit) 201, a ROM (Read Only Memory) 202, a RAM (Random Access Memory) 203, an HDD (Hard Disk Drive) 204, a network interface control unit 205, a scanner interface control unit 206, a printer interface control unit 207, and a panel control unit 208. The CPU 201, the ROM 202, the RAM 203, the HDD 204, the network interface control unit 205, the scanner interface control unit 206, the printer interface control unit 207, and the panel control unit 208 are connected to each other via a bus 209.

The CPU 201 executes software programs of the multifunction peripheral 101 and controls an entire multifunction peripheral 101. The ROM 202 stores boot programs, fixed parameters, etc. of the multifunction peripheral 101. The RAM 203 is used as a temporary storage area for temporarily storing programs, intermediate data, and the like when the CPU 201 controls operations of the multifunction peripheral 101. The HDD 204 stores system software, applications, and various kinds of data. The CPU 201 controls the operations of the multifunction peripheral 101 by executing the boot programs stored in the ROM 202, expanding programs stored in the HDD 204 to the RAM 203, and executing the expanded programs.

The network interface control unit 205 controls transmission/reception of data with the network 105. The scanner interface control unit 206 controls an original document reading processing performed by the scanner 211. The printer interface control unit 207 controls the print processing, etc. performed by the printer 210. The panel control unit 208 controls the touch panel type operating panel 212. For example, the panel control unit 208 displays various kinds of information on the operating panel 212, and also obtains instructions, for example, execution instructions of scan and print, inputted into the operating panel 212 by the user from the operating panel 212.

FIG. 2B shows the hardware configuration of the printing management device 104. As shown in FIG. 2B, the printing management device 104 has a control unit 213, and an operating panel 220. The control unit 213 is connected to the operating panel 220. Further, the control unit 213 includes a CPU 214, a ROM 215, a RAM 216, an HDD 217, a network interface control unit 218, and a panel control unit 219. The CPU 214, the ROM 215, the RAM 216, the HDD 217, the network interface control unit 218, and the panel control unit 219 are connected to each other via a bus 221.

The CPU 214 executes software programs of the printing management device 104 and controls an entire printing management device 104. The ROM 215 stores boot programs, fixed parameters, etc. of the printing management device 104. The RAM 216 is used as a temporary storage area for temporarily storing programs, intermediate data, and the like when the CPU 214 controls operations of the printing management device 104. The HDD 217 stores system software, applications, and various kinds of data. The CPU 214 controls the operations of the printing management device 104 by executing the boot programs stored in the ROM 215, expanding programs stored in the HDD 217 to the RAM 216, and executing the expanded programs. The network interface control unit 218 controls transmission/reception of data with the network 105. The panel control unit 219 controls the touch panel type operating panel 220. For example, the panel control unit 219 displays various kinds of information on the operating panel 220, and also obtains instructions inputted into the operating panel 220 by the user from the operating panel 220.

Figure 3A:
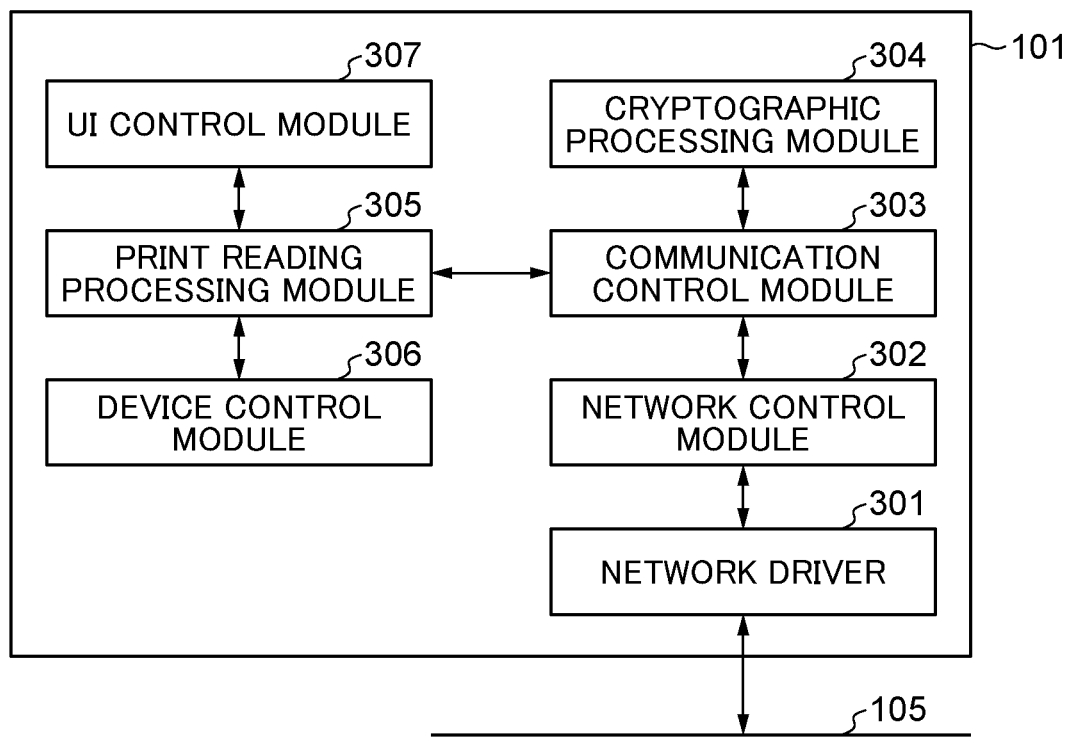
FIG. 3A is a block diagram that schematically shows a software configuration of the multifunction peripheral of FIG. 1.
Figure 3B:
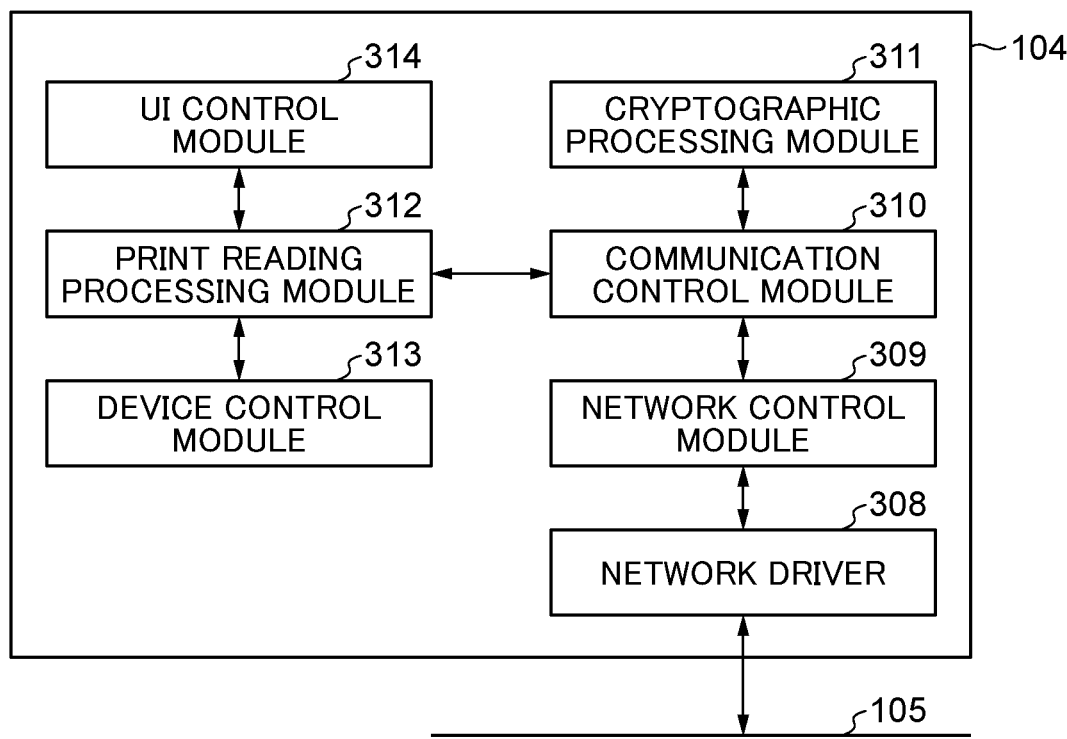
FIG. 3B is a block diagram that schematically shows a software configuration of the printing management device of FIG. 1.

FIG. 3A is a block diagram that schematically shows a software configuration of the multifunction peripheral 101 of FIG. 1, and FIG. 3B is a block diagram that schematically shows a software configuration of the printing management device 104 of FIG. 1. FIG. 3A shows the software configuration of the multifunction peripheral 101. As shown in FIG. 3A, the multifunction peripheral 101 has a network driver 301, a network control module 302, a communication control module 303, a cryptographic processing module 304, a print reading processing module 305, a device control module 306, and a UI (User Interface) control module 307. The processing of these modules is realized by the CPU 201 executing the program expanded in the RAM 203.

The network driver 301 controls the network interface control unit 205 and performs transmission/reception of data with an external device via the network 105. The network control module 302 controls communications below a transport layer in a network communication protocol such as TCP/IP (Transmission Control Protocol/Internet Protocol) and performs transmission/reception of data. The communication control module 303 is a module for controlling a plurality of communication protocols that are supported by the multifunction peripheral 101. For example, encrypted communication such as TLS (Transport Layer Security) supported by the multifunction peripheral 101 is executed by the communication control module 303.

The cryptographic processing module 304 is a module for executing various kinds of cryptographic processing such as data encryption, data decryption, electronic signature generation, electronic signature verification, and hash value generation. For example, in the encrypted communication process such as TLS executed by the communication control module 303, the cryptographic processing module 304 executes an encryption processing.

The print reading processing module 305 is a module for executing the print processing performed by the printer 210, the original document reading processing performed by the scanner 211, etc. The device control module 306 is a module for generating control commands and control data of the multifunction peripheral 101 and performing an overall control of the multifunction peripheral 101. The UI control module 307 is a module for controlling the operating panel 212 and the panel control unit 208.

FIG. 3B shows the software configuration of the printing management device 104. As shown in FIG. 3B, the printing management device 104 has a network driver 308, a network control module 309, a communication control module 310, a cryptographic processing module 311, a print reading processing module 312, a device control module 313, and a UI control module 314. The processing of these modules is realized by the CPU 214 executing the program expanded in the RAM 216.

The network driver 308 controls the network interface control unit 218 and performs transmission/reception of data with the external device via the network 105. The network control module 309 controls the communications below the transport layer in the network communication protocol such as TCP/IP and performs transmission/reception of data. The communication control module 310 is a module for controlling a plurality of communication protocols that are supported by the printing management device 104. For example, encrypted communication such as TLS supported by the printing management device 104 is executed by the communication control module 310.

The cryptographic processing module 311 is a module for executing various kinds of cryptographic processing such as data encryption, data decryption, electronic signature generation, electronic signature verification, and hash value generation. For example, in the encrypted communication process such as TLS executed by the communication control module 310, the cryptographic processing module 311 executes an encryption processing.

The print reading processing module 312 is a module for supporting execution of the print processing performed by the printer 210 of the multifunction peripheral 101, the original document reading processing performed by the scanner 211 of the multifunction peripheral 101, etc. The device control module 313 is a module for generating control commands and control data of the printing management device 104 and performing an overall control of the printing management device 104. The UI control module 314 is a module for controlling the operating panel 220 and the panel control unit 219.

Figure 4:
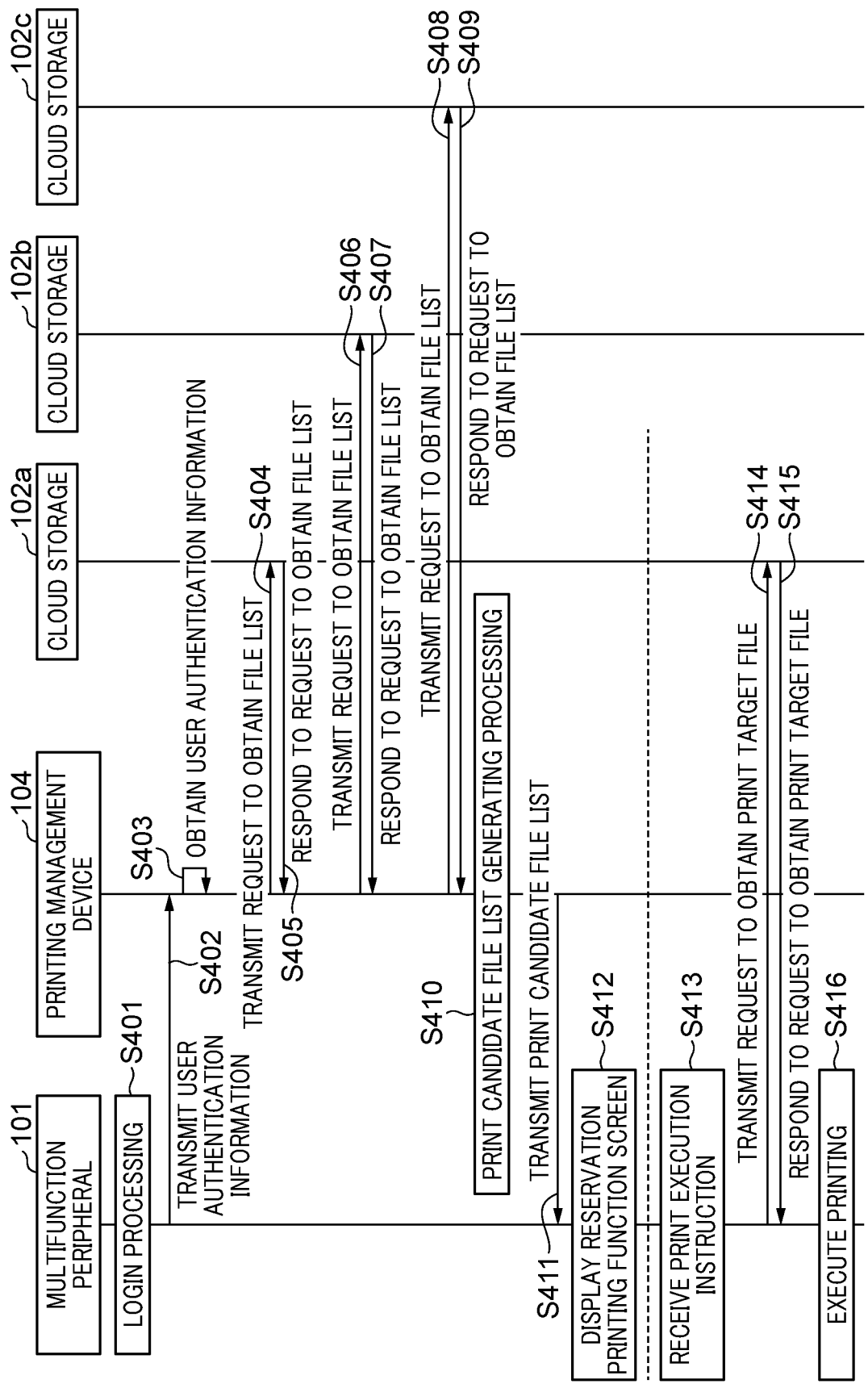
FIG. 4 is a sequence diagram for explaining a series of flows of the multifunction peripheral from receiving a login request by a user to executing a print processing in the printing system of FIG. 1.

FIG. 4 is a sequence diagram for explaining a series of flows of the multifunction peripheral 101 from receiving a login request by the user to executing the print processing in the printing system 100 of FIG. 1. In FIG. 4, each processing executed by the multifunction peripheral 101 is realized by the CPU 201 of the multifunction peripheral 101 executing the program expanded in the RAM 203. Further, in FIG. 4, each processing executed by the printing management device 104 is realized by the CPU 214 of the printing management device 104 executing the program expanded in the RAM 216.

Figure 5:
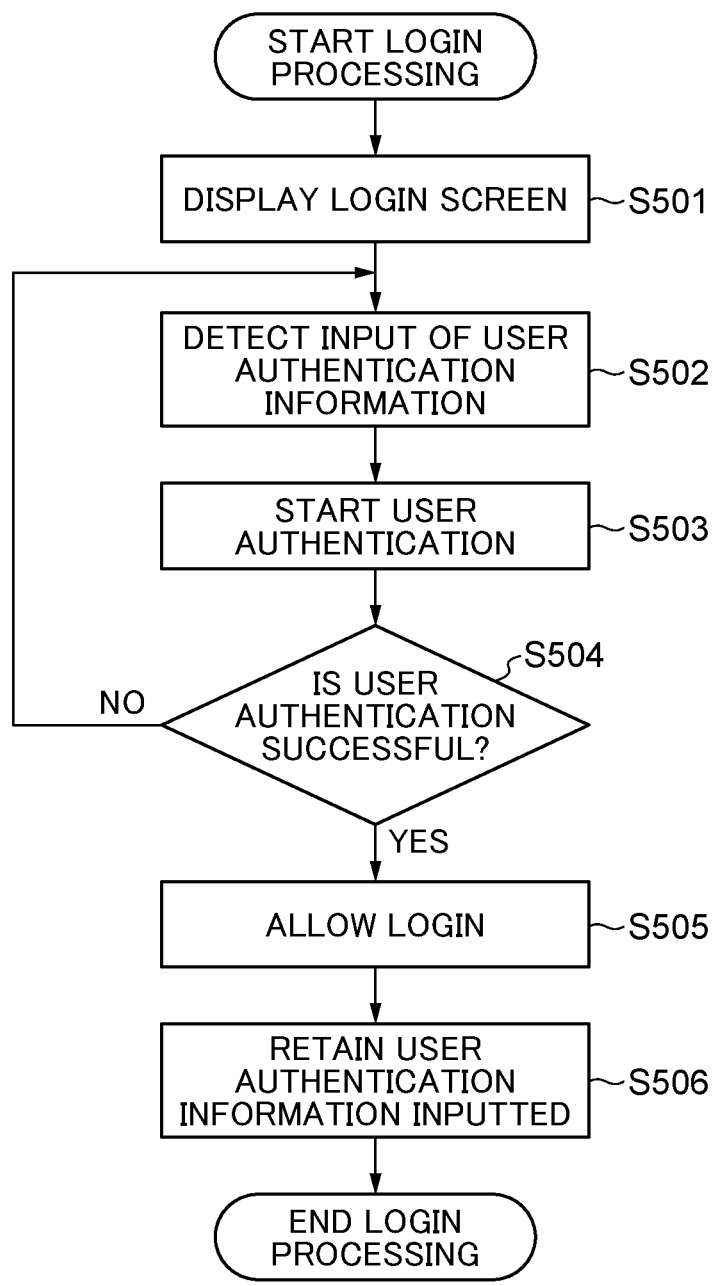
FIG. 5 is a flowchart that shows procedures of a login processing of a step S401 of FIG. 4.

As shown in FIG. 4, at first, the CPU 201 of the multifunction peripheral 101 executes a login processing of FIG. 5 (a step S401).

FIG. 5 is a flowchart that shows procedures of the login processing of the step S401 of FIG. 4.

As shown in FIG. 5, the CPU 201 causes the operating panel 212 to display a login screen (not shown) (a step S501). When the CPU 201 detects that the user has inputted user authentication information including a user ID (identification) and a password into the login screen (a step S502), the CPU 201 starts user authentication by using the user authentication information (a step S503). Next, the CPU 201 determines whether or not the user authentication is successful (a step S504). In the user authentication, for example, the CPU 201 collates the user authentication information inputted into the login screen with a plurality of registration information pre-registered. The registration information includes a user ID and a password, and is stored in advance in the HDD 204 or the like. In the case that the user authentication information inputted into the login screen corresponds to any one of the plurality of registration information described above, for example, in the case that the user authentication information inputted into the login screen and any one of the plurality of registration information described above accord, the CPU 201 determines that the user authentication is successful. On the other hand, in the case that the user authentication information inputted into the login screen does not correspond to any of the plurality of registration information described above, the CPU 201 determines that the user authentication is failed.

If a result of a determination in the step S504 is that the user authentication is failed, the CPU 201 displays an error screen indicating that the user authentication is failed on the operating panel 212, and the login processing returns to the step S502. If the result of the determination in the step S504 is that the user authentication is successful, the CPU 201 allows the user who has inputted the user authentication information to log into the multifunction peripheral 101 (a step S505). As a result, the user can use various functions of the multifunction peripheral 101, and for example, can instruct the multifunction peripheral 101 to start printing a file retained in the multifunction peripheral 101. Next, the CPU 201 retains the user authentication information inputted by the user in the step S502 in the RAM 203 (a step S506), and the login processing ends.

Returning to FIG. 4, when the login processing is completed, the CPU 201 that functions as a user authentication information transmission unit transmits the user authentication information retained in the RAM 203 to the printing management device 104 (a step S402).

The CPU 214 of the printing management device 104 that functions as a user authentication information obtaining unit obtains the user authentication information, which is inputted when logging into the multifunction peripheral 101, from the multifunction peripheral 101 (a step S403). Next, the CPU 214 that functions as an obtaining request transmission unit transmits a request to obtain a file list (hereinafter referred to as "a file list obtaining request") from the user corresponding to the user authentication information to the cloud storage 102a, which is the server registered in the printing management device 104 (a step S404). This file list includes names, file formats, update dates and times, etc. of files generated by the user corresponding to the user authentication information (hereinafter referred to as "user authentication information corresponding files") among a plurality of files stored in the cloud storage 102a. Further, the CPU 214 also transmits the file list obtaining request from the user corresponding to the user authentication information to the cloud storage 102b and the cloud storage 102c, which are the servers registered in the printing management device 104

(steps S406 and S408). The cloud storage 102a responds to the file list obtaining request received from the printing management device 104 (a step S405).

Specifically, the cloud storage 102a transmits a file list corresponding to the file list obtaining request to the printing management device 104. As with the cloud storage 102a, the cloud storage 102b and the cloud storage 102c also respond to the file list obtaining request received from the printing management device 104 (steps S407 and S409).

The CPU 214 of the printing management device 104 executes a print candidate file list generating processing of FIG. 6 based on the file lists received from the cloud storage 102a to the cloud storage 102c, respectively (a step S410).

FIG. 6 is a flowchart that shows procedures of the print candidate file list generating processing of the step S410 of FIG. 4. Further, in the print candidate file list generating processing of FIG. 6, it is assumed that a print target priority setting indicating priorities of the files stored in the cloud storage 102a to the cloud storage 102c is already stored in the HDD 217. In the embodiment, in an estimated print data list 803 of a reservation printing function screen 801 of FIG. 8 that will be described later, names of the files stored in the cloud storage 102a to the cloud storage 102c are displayed in a descending order of the priorities in the print target priority setting.

As shown in FIG. 6, the CPU 214 determines whether or not have a plurality of file lists been received (a step S601). In the step S601, for example, in a case of receiving the file list from the cloud storage 102a to the cloud storage 102c respectively as described above, the CPU 214 determines that the plurality of file lists have been received. On the other hand, in a case of receiving the file list from only any one of the cloud storage 102a to the cloud storage 102c, the CPU 214 determines that the plurality of file lists have not been received.

Figure 7A:
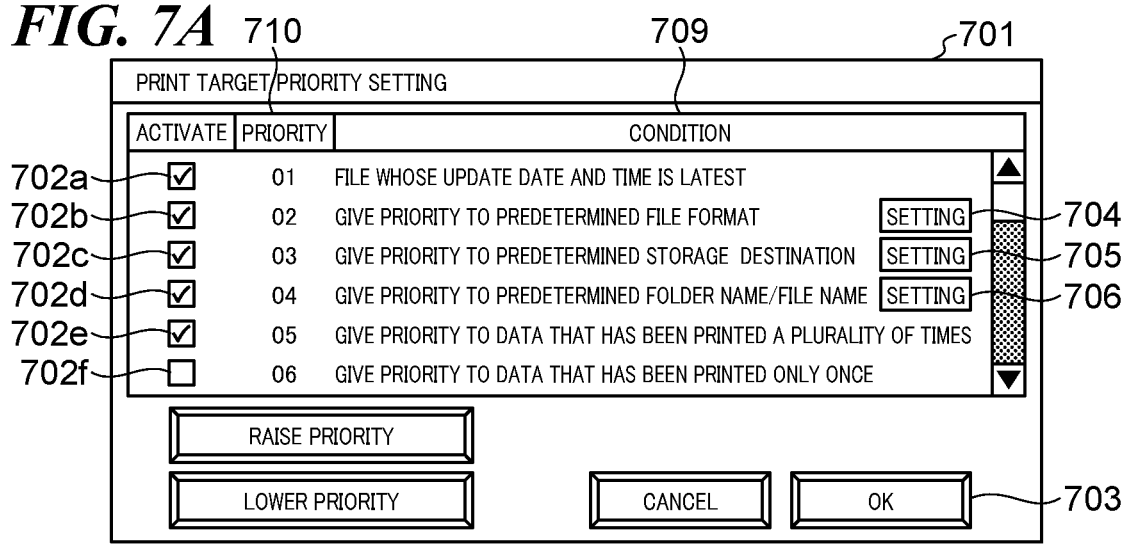
FIGS. 7A, 7B and 7C are diagrams that show an example of a setting screen displayed on an operating panel of the printing management device of FIG. 2B.

If a result of a determination in the step S601 is that the plurality of file lists have not been received, the print candidate file list generating processing proceeds to a step S603 that will be described later. If the result of the determination in the step S601 is that the plurality of file lists have been received, the CPU 214 performs a synthesizing processing that synthesizes the plurality of file lists received (storage file lists) (a step S602). Next, the CPU 214 obtains the print target priority setting from the HDD 217 (the step S603). In the embodiment, it is possible for the user such as an administrator of the printing system 100 to set the print target priority setting in a setting screen 701 of FIG. 7A that is displayed on the operating panel 220, and the print target priority setting is stored in the HDD 217. Moreover, the setting screen 701 may be displayed on a device other than the operating panel 220, for example, the setting screen 701 may be displayed on the PC 103 as a remote UI that is provided by the printing management device 104 via the network 105.

On the setting screen 701, when a OK button 703 is pressed in a selected state that any one of activating buttons 702a, 702b, 702c, 702d, 702e and 702f (hereinafter simply referred to as "the activating buttons 702a to 702f") is selected, a condition 709 corresponding to the activating button in the selected state is set as a condition to determine a display order of the files in the estimated print data list 803 that will be described later.

For example, when a condition 709 corresponding to the activating button 702a is set, the user authentication information corresponding files whose update dates and times are the latest, are displayed at a top of the estimated print data list 803 that will be described later. Further, when a condition 709 corresponding to the activating button 702b is set, the user authentication information corresponding files that have a file format set by selecting a setting button 704, are displayed at the top of the estimated print data list 803 that will be described later. For example, the administrator selects the setting button 704 to set a printable file format such as "pptx", "doc", "pdf".

Further, when a condition 709 corresponding to the activating button 702c is set, the user authentication information corresponding files that are stored in a folder within the cloud storage set by selecting a setting button 705, are displayed at the top of the estimated print data list 803 that will be described later. Furthermore, when a condition 709 corresponding to the activating button 702d is set, the user authentication information corresponding files that have a name set by selecting a setting button 706, are displayed at the top of the estimated print data list 803 that will be described later. Further, when a condition 709 corresponding to the activating button 702e is set, the user authentication information corresponding files that have been printed a plurality of times, are displayed at the top of the estimated print data list 803 that will be described later. Furthermore, when a condition 709 corresponding to the activating button 702f is set, the user authentication information corresponding files that have been printed only once, are displayed at the top of the estimated print data list 803 that will be described later. Moreover, the priority of a condition 709 corresponding to the activating button in an unselected state is set to the lowest. For example, in a case that the activating button 702f is in the unselected state, the user authentication information corresponding files that have been printed only once, are displayed at a bottom of the estimated print data list 803 that will be described later.

Figure 7B:
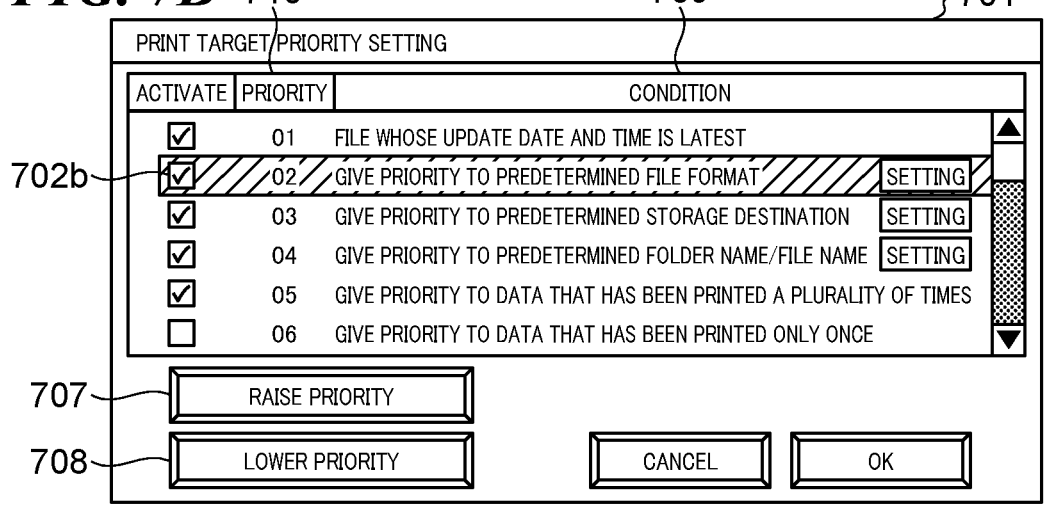
Figure 7C:
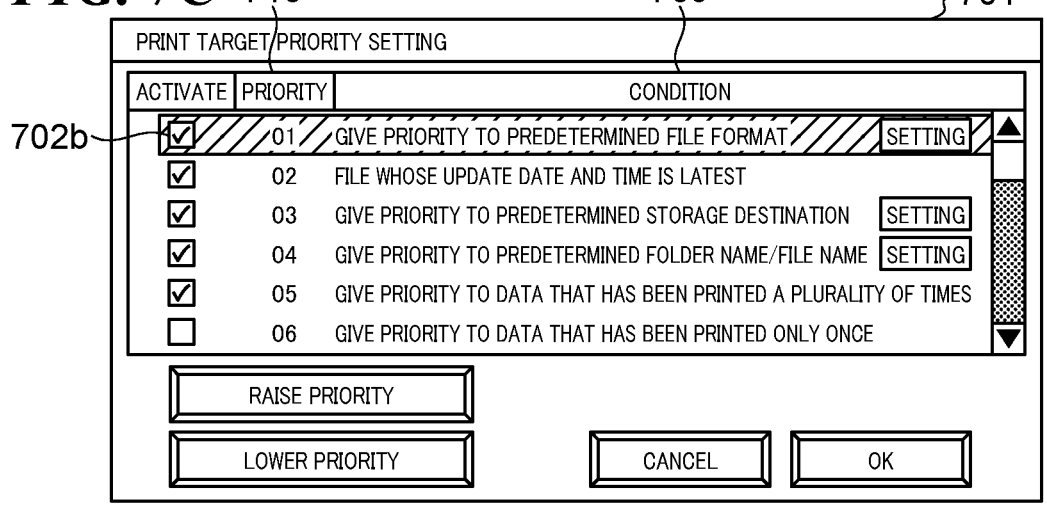

Further, a priority 710 of the condition 709 corresponding to the activating button in the selected state is displayed on the setting screen 701, and this priority can be changed. For example, when the activating button 702b is pressed and the activating button 702b is switched to the selected state, as shown in FIG. 7B, the color of a region corresponding to the activating button 702b is inverted and an activated state is set. Subsequently, for example, when a "raise priority" button 707 is pressed, as shown in FIG. 7C, the priority 710 of the condition 709 corresponding to the activating button 702b is raised one rank. On the other hand, when a "lower priority" button 708 is pressed, the priority 710 of the condition 709 corresponding to the activating button 702b is lowered one rank. When the OK button 703 is pressed, set values that are set by the setting screen 701 in this way are stored in the HDD 217 as the print target priority setting.

In the embodiment, the priorities 710 of files having a relatively high possibility of being selected as a print target by the user (hereinafter referred to as "print desired degree"), are set higher than the priorities 710 of other files. For example, the files having a relatively high print desired degree include the user authentication information corresponding files whose update dates and times are the latest, the user authentication information corresponding files that have a predetermined file format set in advance, the user authentication information corresponding files that are stored in a predetermined folder within the cloud storage set in advance, the user authentication information corresponding files that have a name set in advance, and the user authentication information corresponding files that have been printed a plurality of times. Further, the priorities 710 of files having a relatively low print desired degree, are set lower than the priorities 710 of other files. For example, the files having a relatively low print desired degree include the user authentication information corresponding files that have been printed only once.

Returning to FIG. 6, the CPU 214 determines whether or not the print target priority setting is valid (a step S604). In the step S604, for example, in a case that any one of the activating buttons 702a to 702f is in the selected state, the CPU 214 determines that the print target priority setting is valid. On the other hand, in a case that all of the activating buttons 702a to 702f are in the unselected state, the CPU 214 determines that the print target priority setting is invalid. Moreover, in the embodiment, a determination in the step S604 may be performed based on a set value that indicates whether the print target priority setting is valid or invalid.

If a result of the determination in the step S604 is that the print target priority setting is invalid, the print candidate file list generating processing proceeds to a step S606 that will be described later. If the result of the determination in the step S604 is that the print target priority setting is valid, the CPU 214 performs a sort processing with respect to the file list on the basis of the print target priority setting (a step S605). Moreover, in the step S605, in the case of being determined in the step S601 described above that the plurality of file lists have been received, a file list obtained by the synthesizing processing of the step S602 is used. On the other hand, in the step S605, in the case of being determined in the step S601 that the plurality of file lists have not been received, the file list obtained by the printing management device 104 from any one of the cloud storage 102a to the cloud storage 102c is used. Hereinafter, the file list used in the step S605 will be referred to as "a processing target file list".

In the sort processing, the CPU 214 sorts an arrangement order of names of a plurality of user authentication information corresponding files included in the processing target file list in the descending order of the priorities 710 of the print target priority setting. Next, the CPU 214 generates the print candidate file list (a step S606). For example, if the result of the determination in the step S604 is that the print target priority setting is valid, the CPU 214 that functions as a list generating unit generates the print candidate file list, in which the names of the plurality of user authentication information corresponding files in the processing target file list are arranged in the descending order of the priorities 710 of the print target priority setting. On the other hand, if the result of the determination in the step S604 is that the print target priority setting is invalid, the CPU 214, for example, copies the processing target file list as the print candidate file list. That is, in this case, an arrangement order of the names of the user authentication information corresponding files in the print candidate file list is the same as the arrangement order of the names of the user authentication information corresponding files in the processing target file list. Next, the CPU 214 stores the generated print candidate file list in RAM 216.

Returning to FIG. 4, the CPU 214 of the printing management device 104 that functions as a transmission unit transmits the above print candidate file list to the multifunction peripheral 101 (a step S411).

The CPU 201 of the multifunction peripheral 101 stores the print candidate file list obtained from the printing management device 104 in the HDD 204. Further, the CPU 201 that functions as a display control unit controls to display the reservation printing function screen 801 (a print instruction screen) of FIG. 8 on the operating panel 212 based on the print candidate file list (a step S412).

The reservation printing function screen 801 is a screen for the user to instruct the execution of printing of files reserved in the multifunction peripheral 101 and includes a received print data list 802 (a second list) and the estimated print data list 803 (a first list).

In the received print data list 802, a list of files transmitted from the PC 103 or the like according to the user's instruction and temporarily retained (reserved) in the HDD 204, which functions as a retaining unit, is displayed. Further, since the files displayed in the received print data list 802 are the files reserved by the user's instruction, these files are files having an extremely high print desired degree.

In the estimated print data list 803, the print candidate file list transmitted from the printing management device 104 in the step S411 is displayed. In the estimated print data list 803, the user authentication information corresponding files stored in the cloud storage 102a to the cloud storage 102c are displayed in the descending order of the priorities 710 of the print target priority setting. In the estimated print data list 803, based on the priority 710, the print candidate files having a relatively high print desired degree are displayed with priority over other files. Specifically, the user authentication information corresponding files whose update dates and times are the latest, the user authentication information corresponding files that have a predetermined file format set in advance, the user authentication information corresponding files that are stored in a predetermined folder within the cloud storage set in advance, the user authentication information corresponding files that have a name set in advance, the user authentication information corresponding files that have been printed a plurality of times, etc. are displayed higher than other files. On the other hand, in the estimated print data list 803, print candidate files having a relatively low print desired degree, for example, the user authentication information corresponding files that have been printed only once are displayed lower than other files. Further, in the estimated print data list 803, the storage location, a generation date and time, etc. of each user authentication information corresponding file are displayed.

When the CPU 201 receives, for example, a print execution instruction from the user that selects a check box corresponding to a file stored in the cloud storage 102a and presses a print button 804 on the reservation printing function screen 801 (a step S413), the CPU 201 transmits a request to obtain a print target file corresponding to the selected check box (a step S414).

The cloud storage 102a responds to the request to obtain the print target file received from the multifunction peripheral 101 (a step S405). Specifically, the cloud storage 102a transmits files corresponding to the request to obtain the print target file to the multifunction peripheral 101. The CPU 201 of the multifunction peripheral 101 receives the files from the cloud storage 102a and executes printing of the received files by performing the print processing performed by the printer 210 that functions as a printing unit (a step S416).

According to the above-described embodiment, the reservation printing function screen 801 that includes the received print data list 802, which shows the files reserved by the user's instruction, and the estimated print data list 803, is displayed on the operating panel 212. That is, the files having an extremely high print desired degree such as the files reserved by the user's instruction, are displayed on the same screen in a way capable of distinguishing from other files. As a result, it is possible to prevent the files having an extremely high print desired degree from being mixed with other files and making it difficult for the user to find the file being the print target. Further, the estimated print data list 803 is the print candidate file list that is obtained by synthesizing the plurality of file lists obtained from the cloud storage 102*a* to the cloud storage 102*c*. As a result, when the user selects the file being the print target, it is possible to eliminate labor and time for selecting a display screen of a desired file list from display screens of file lists of the plurality of cloud storages. As described above, in the embodiment, it is possible to prevent the files having an extremely high print desired degree from being mixed with other files and making it difficult for the user to find the file being the print target, and at the same time, it is possible to eliminate the labor and the time for selecting the display screen of the desired file list. As a result, it is possible for the user to easily find the file being the print target.

In the above-described embodiment, the multifunction peripheral 101 obtains the print candidate file list from the printing management device 104. Thereby, based on the obtained print candidate file list, the reservation printing function screen 801 including the estimated print data list 803 can be easily displayed on the operating panel 212.

In the above-described embodiment, the display order of the files in the estimated print data list 803 is determined based on the print target priority setting that indicates the priorities of the files stored in the cloud storage 102*a* to the cloud storage 102*c*. Thereby, based on the print target priority setting, it is possible to control the display order of the files in the estimated print data list 803 so that the user can easily find the file being the print target.

In the above-described embodiment, the print candidate files having a relatively high print desired degree among the user authentication information corresponding files stored in the cloud storage 102*a* to the cloud storage 102*c* are displayed higher than other files. The print candidate files having a relatively high print desired degree include the user authentication information corresponding files whose update dates and times are the latest, the user authentication information corresponding files that are stored in a predetermined folder within the cloud storage set in advance, the user authentication information corresponding files that have a name set in advance, and the user authentication information corresponding files that have been printed a plurality of times. As a result, it is possible to perform a list display that the user can easily find the file being the print target.

Further, in the above-described embodiment, the print candidate files having a relatively low print desired degree among the user authentication information corresponding files stored in the cloud storage 102*a* to the cloud storage 102*c* are displayed lower than other files. The print candidate files having a relatively low print desired degree include the user authentication information corresponding files that have been printed only once. As a result, it is possible to prevent the print candidate files having a relatively low print desired degree from being displayed at the top and making it difficult for the user to find the file being the print target.

Although the present disclosure includes the above-described embodiment, the present disclosure is not limited to the above-described embodiment. For example, the multifunction peripheral 101 may be configured to have functions of the printing management device 104 instead of the multifunction peripheral 101 and the printing management device 104 that are separate devices. That is, the CPU 201 of the multifunction peripheral 101 that functions as the list generating unit executes each processing executed by the CPU 214 of the printing management device 104 in FIGS. 4 and 6 to generate the print candidate file list, and the setting screen 701 is displayed on the operating panel 212 of the multifunction peripheral 101. By such a configuration, it is possible to obtain the same effect as that of the above-described embodiment.

Further, in the above-described embodiment, although the configuration that the server is the cloud storage has been described, the configuration of the server is not limited to this. For example, the server may be an on-premise file server.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-150538, filed Sep. 8, 2020, which is hereby incorporated by reference herein in its entirety.

What is claimed is:

1. An image forming apparatus configured to print files stored in a plurality of servers, the image forming apparatus comprising:
   a retaining unit configured to retain files transmitted according to an instruction issued by a user;
   a display control unit configured to control a display of a print instruction screen that includes a first list generated based on a storage file list showing files, which are files stored in any one of the plurality of servers and correspond to user authentication information inputted when logging into the image forming apparatus, and a second list showing the retained files; and
   a printing unit configured to print files selected by the user on the print instruction screen,
   wherein the first list is a list obtained by synthesizing a plurality of the storage file lists that are transmitted from the plurality of servers, respectively, and wherein in the first list, files that have been printed a plurality of times among the files, which are the files stored in any one of the plurality of servers and correspond to the user authentication information inputted when logging into the image forming apparatus, are displayed at a top.

2. The image forming apparatus according to claim 1, further comprising:
a list generating unit configured to generate the first list.

3. The image forming apparatus according to claim 1, wherein the first list is obtained from an information processing apparatus that generates the first list.

4. The image forming apparatus according to claim 1, wherein a display order of files in the first list is determined based on a priority setting that indicates priorities of the files stored in any one of the plurality of servers.

5. The image forming apparatus according to claim 4, wherein in the first list, files that have been printed only once among the files, which are the files stored in any one of the plurality of servers and correspond to the user authentication information inputted when logging into the image forming apparatus, are displayed at a bottom.

6. A control method for an image forming apparatus that prints files stored in a plurality of servers, the control method comprising:
retaining files transmitted according to an instruction issued by a user;
controlling a display of a print instruction screen that includes a first list generated based on a storage file list showing files, which are files stored in any one of the plurality of servers and correspond to user authentication information inputted when logging into the image forming apparatus, and a second list showing the retained files; and
printing files selected by the user on the print instruction screen,
wherein the first list is a list obtained by synthesizing a plurality of the storage file lists that are transmitted from the plurality of servers, respectively, and
wherein in the first list, files that have been printed a plurality of times among the files, which are the files stored in any one of the plurality of servers and correspond to the user authentication information inputted when logging into the image forming apparatus, are displayed at a top.

7. A printing system comprising:
an information processing apparatus that transmits files obtained from a plurality of servers for storing files; and
an image forming apparatus that prints files received from the information processing apparatus,
wherein the information processing apparatus comprises:
a user authentication information obtaining unit configured to obtain user authentication information inputted when logging into the image forming apparatus;
an obtaining request transmission unit configured to transmit a request to obtain a storage file list showing files, which are files stored in any one of the plurality of servers and correspond to the user authentication information, to the plurality of servers, respectively;
a list generating unit configured to generate a first list by synthesizing a plurality of the storage file lists obtained from the plurality of servers; and
a transmission unit configured to transmit the first list, and
wherein the image forming apparatus comprises:
a user authentication information transmission unit configured to transmit the user authentication information;
a retaining unit configured to retain files transmitted according to an instruction issued by a user;
a display control unit configured to control a display of a print instruction screen that includes the first list received from the information processing apparatus and a second list showing the retained files; and
a printing unit configured to print files selected by the user on the print instruction screen, and
wherein in the first list, files that have been printed a plurality of times among the files, which are the files stored in any one of the plurality of servers and correspond to the user authentication information inputted when logging into the image forming apparatus, are displayed at a top.

* * * * *